(12) United States Patent
Jacob Sushil et al.

(10) Patent No.: US 9,292,872 B2
(45) Date of Patent: Mar. 22, 2016

(54) INTERACTIVE PRODUCT CONFIGURATION

(75) Inventors: George T. Jacob Sushil, Bangalore (IN); Kalapriya Kannan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1134 days.

(21) Appl. No.: 13/311,896

(22) Filed: Dec. 6, 2011

(65) Prior Publication Data

US 2013/0145274 A1    Jun. 6, 2013

(51) Int. Cl.
 G06F 3/048    (2013.01)
 G06Q 30/06    (2012.01)

(52) U.S. Cl.
 CPC .................................. *G06Q 30/0621* (2013.01)

(58) Field of Classification Search
 CPC ..... H04N 7/15; G06Q 30/0621; G06F 3/0484
 USPC ......................................... 715/753; 705/26.5
 See application file for complete search history.

(56) References Cited

U.S. PATENT DOCUMENTS

| | | | | |
|---|---|---|---|---|
| 4,829,423 | A | * | 5/1989 | Tennant et al. ................... 704/8 |
| 5,920,877 | A | * | 7/1999 | Kolster ......................... 715/235 |
| 6,963,849 | B1 | | 11/2005 | Chaturvedi et al. |
| 7,617,169 | B1 | | 11/2009 | Owen et al. |
| 2007/0282776 | A1 | | 12/2007 | Jaluka et al. |
| 2010/0023418 | A1 | | 1/2010 | Bader et al. |
| 2010/0153142 | A1 | | 6/2010 | Vasudevan et al. |
| 2010/0299616 | A1 | * | 11/2010 | Chen et al. .................... 715/753 |
| 2013/0091033 | A1 | * | 4/2013 | Goodman et al. ........... 705/26.5 |

FOREIGN PATENT DOCUMENTS

EP    2178043 A1    4/2010

OTHER PUBLICATIONS

IBM, "Method to Utilize Multiple User Data in Recommendation Systems for Coordination of Design and Purchase Decisions", IP.com Prior Art Database, IP.com No. IPCOM000190337D, Nov. 24, 2009, 3 pages.

* cited by examiner

*Primary Examiner* — Haoshian Shih
(74) *Attorney, Agent, or Firm* — Jeffrey L. Streets

(57) ABSTRACT

An example product configuration system includes a Configuration Input Manager that receives a selection of configuration parameters from a system user and coordinates obtaining input from the external information sources regarding the selected configuration parameters. Requests for input are transmitted along a plurality of communication channels individually selected for each configuration parameter. The Configuration Builder then assimilates the various input, such as the collective knowledge, opinions, preferences, experience, and other input provided by the external information sources, and compiles that information to generate a plurality of proposed product configurations that are consistent with the information provided.

8 Claims, 3 Drawing Sheets

INTERACTIVE PRODUCT CONFIGURATION

BACKGROUND

1. Field of the Invention

The present invention relate generally to computer-enabled interactive methods, and more specifically to collaborative systems and methods for enabling a product configuration.

2. Background of the Related Art

People like the ability to customize products, to satisfy their specific needs and to express their individuality. In an era of mass production, customizing a product typically entails selecting from among predefined options, such as pre-fabricated parts, rather than creating a "one-off" design. The flexibility of customizing the product and the corresponding ability of a product to best satisfy the wants and needs of a customer therefore depends on the available options. However, as technology advances, the features for products and services grow increasingly sophisticated. For example, when purchasing an automobile, simply choosing an engine can be difficult, and can have significant implications for factors affecting customer satisfaction, such as the driving experience and the long-term cost of ownership. Additionally, advances in consumer electronics have led to new options of increasing complexity. For example, automobiles are now available with a host of optional accessories, such as computer and cell-phone interfaces, audiovisual entertainment systems, navigation systems, and remote diagnostic and assistance systems and services. Selecting the right combination of features to customize a product can overwhelm a consumer. This uncertainty about how best to configure a particular product can cause the consumer to select a less than optimal product configuration, especially with possible sales pressure to purchase certain options.

BRIEF SUMMARY

An example embodiment provides a computer program product including computer usable program code embodied on a non-transitory, computer usable storage medium for performing a product configuration method. A set of configuration parameters for a product are defined along with a predefined set of parameter values for each configuration parameter. Each configuration parameter is individually associated with one or more different user interface (UI) objects. Each UI object is configured for receiving electronic input regarding the associated configuration parameter. A channel is selected for each configuration parameter and the configuration parameters are transmitted over a network from an originating user interface to one or more remote user interfaces on the selected channels. The UI objects selected for the transmitted configuration parameters are initiated at the one or more remote user interfaces. Input is received from external information sources via the UI objects regarding the user selection of configuration parameters. The received input regarding the configuration parameters are optionally transmitted back to the originating user interface over the selected channels. A data structure is generated representing different combinations of configuration parameter values that are consistent with the received input from the external information sources.

DETAILED DESCRIPTION

A system and method are disclosed for customizing a product using an electronic platform. The platform includes a framework enabling a system user to receive input from various external information sources regarding selected configuration parameters. Each configuration parameter has a predefined set of parameter values. Typically, the parameter values for a particular configuration parameter are mutually exclusive values, in that only one value may be selected for each configuration parameter in a given product configuration. While the system user obtains input from external information sources, the system user is the designated decision maker in configuring the product, and has the ultimate authority to approve a specific product configuration. The system user typically has the purchasing authority for the configured product. The system user may also be the intended product user, although in some cases the system user configures and optionally purchases the configured product for a product user other than the system user. The external information sources used to inform the system user's decision may be any party other than the system user, such as experts in the field, prior purchasers of the product, friends, coworkers, or family members. Some of the external information sources may be intended users of the product to be configured.

A disclosed system embodiment includes a Configuration Input Manager and a Configuration Builder. The Configuration Input Manager receives a selection of configuration parameters from the system user and coordinates obtaining input from the external information sources regarding the selected configuration parameters. This may include broadcasting requests for input and receiving the requested input along a plurality of communication channels individually selected for each configuration parameter. The Configuration Builder then assimilates the various input, such as the collective knowledge, opinions, preferences, experience, and other input provided by the external information sources, and compiles that information to generate a plurality of proposed product configurations that are consistent with the information provided. The Configuration Builder presents the proposed product configurations to the system user for finally selecting one of the plurality of product configurations. This approach helps ensure that the system user selects a product configuration that is well suited to the needs and wants of the intended product user(s). However, the approach is not a group decision-making process, per se, since ultimate authority resides with the system user for selecting or approving each configuration parameter.

Figure 1:
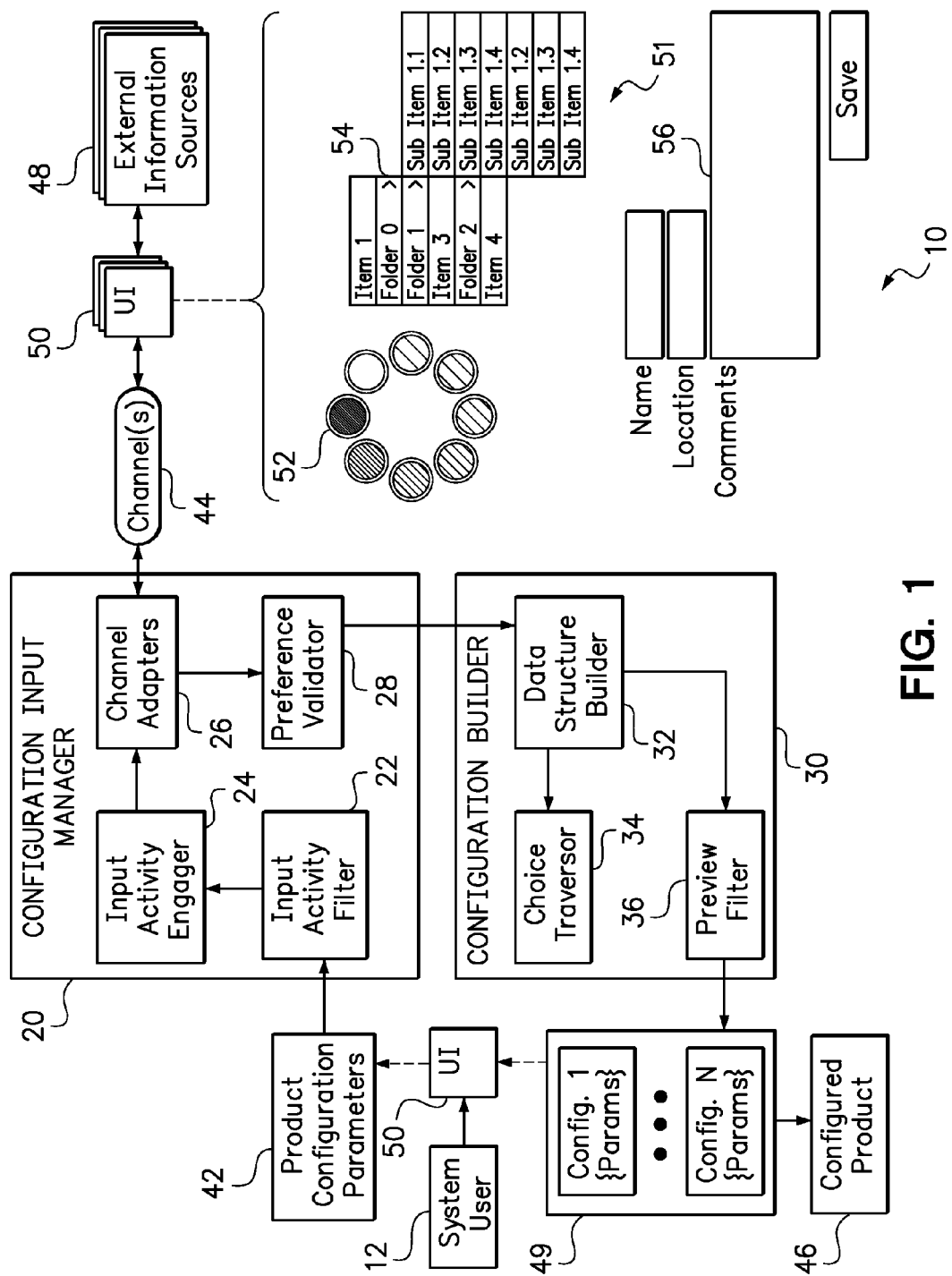
FIG. 1 is a block diagram of a product configuration system according to an example embodiment.

The disclosed system and method have practical applications in configuring any of a wide array of consumer products. The product may be a physical product or a service. An example of a configurable physical product is an automobile, with configuration parameters such as paint color, engine model, and optional interior and exterior accessories. An example of a configurable service product is wireless telephone service plan, with configuration parameters such as the number of included minutes per billing cycle and some different levels of data connectivity from which to choose. The system and method may also be applied to products that include physical product and service aspects. For instance, a user may apply the system and method to arrange a movie viewing with friends. Separate configuration parameters could be specified for a desired movie title, location, and time, and allow the friends to make selections for each parameter and to provide commentary about the different preferences FIG. 1 is a block diagram of a product configuration system 10 according to an example embodiment. An electronic user interface (UI) 50 is provided for a system user 12 (a human) to interface with the product configuration system 10, to seek input from external sources 48 for help in configuring a product 46. The UI 50 includes hardware components (physical), such as a display screen, keyboard, and pointing device, and software components (logical), such as drivers for the hardware and for performing various actions discussed below in response to user input. A product configuration database contains a plurality of product configuration parameters 42 for configuring the product 46. Each configuration parameter has a predefined set of mutually exclusive values that the system user may select, i.e., only one value may be selected for each configuration parameter in a given product configuration. For example, a paint color parameter may have a plurality of predefined color values or an engine model parameter may have a plurality of predefined engine models. A feature for which the only option is to include or not include the feature, such as an optional accessory, may be represented by a binary configuration parameter having two possible values ("yes" or "no"). The configuration parameters and the predefined set of values from which to choose may be electronically stored in system memory. Another UI 50 is provided for people of the external information sources 48 to interface with the product configuration system 10 to provide their input in configuring the product 46. The external information sources 48 include people with differing perspectives or areas of expertise. The external information sources 48 may include intended users of the product 46, such as family members in the case of a household purchase or coworkers in the case of a business purchase, who may provide select specific values for the configuration parameters. The external information sources 48 may also include people other than the intended users of this particular product 46, such as experts in the field or previous purchasers of similar products.

The product configuration system 10 is diagrammatically organized in two main parts. The first part of the product configuration system 10 is a Configuration Input Manager 20 that includes components for obtaining input from the external information sources 48 regarding the configuration parameters 42. The second part of the product configuration system 10 is a Configuration Builder 30 that includes components for receiving and compiling the input from the different external sources 48 to generate a plurality ("N") of proposed product configurations 49 that are consistent with the information provided by the external information sources 48. Blocks inside the Configuration Input Manager 20 and the Configuration Builder 30 are used to represent different modules. The proposed product configurations 49 are presented to the system user 12 for selecting a final configuration for the end product 46. The end user(s) of the configured product may include the system user 12, in the case where the system user 12 is configuring a product for his or her own use.

A first component of the Configuration Input Manager 20 is the input activity filter 22. The input activity filter 22 initially receives a subset of the configuration parameters 42 selected by the system user 12. The term "input activity" (or simply "activity") in the context of FIG. 1 includes different formats of electronic input provided by the external information sources 48 about the configuration parameters 42. The input activity filter 22 is capable of selecting an input activity and an associated UI object 51 for each of the different configuration parameters 42. For example, an electronic color palette 52 is a UI object that may be used for the input activity of selecting a color, a comment box 56 is a UI object used for the input activity of posting a comment about a configuration parameter, and a multi-choice selector such as a drop-down menu 54 is a UI object used for the input activity of selecting from a predefined list. Other examples of UI objects 51 provided for specific types of input activities also include a blog or forum for the activity of posting blog or forum commentary. A feature for which the only choice is to include or exclude that feature (e.g. an optional accessory) may be represented by a binary configuration parameter as selected by a binary selector. The process by which the activity filter 22 selects from among available UI objects 51 for each of the different configuration parameters 42 is referred to as "activity filtering."

The UI objects 51, themselves, may exist externally to the product configuration system 10 or at least externally to the Configuration Input Manager 20 and Configuration Builder 30. For example, the UI objects 51 may be defined in the UI 50, and there may be one or more instance of the UI 50 at various remote locations of a network, where different members of the external information sources 48 may provide input on the configuration parameters. However, the associations between each configuration parameter and one or more externally located UI objects 51 exist internally to the input activity filter 22. The input activity filter 22 associates at least one of the specific configuration parameters 42 with each UI object. For example, the input activity filter 22 may automatically select the color palette 52 as the UI object for specifying the color of an automobile, the multi-choice drop-down menu 54 for selecting one of three different engine models, and a binary selector (not shown) for each of a plurality of optional accessories.

Some input activities may involve the external information sources 48 recommending a specific value for a configuration parameter. For example, the color palette 52 and drop-down menu 54 each are capable of storing specific color values. Such a UI object may be used for setting a default value as a recommendation by the external information sources, for subsequent approval by the system user 12. Other input activities may be more subjective, qualitative, or otherwise informative, without necessarily narrowing the configuration parameter to a specific value. For example, the comment box 56 allows an external information source 48 to comment about a configuration parameter, such as to mention the advantages and disadvantages to certain values. This type of input may be electronically scanned and converted into a specific default value of a configuration parameter (subject to approval by the system user), such as where an external information source 48 used a comment box to suggest a diesel engine and to explain the merits of that choice for a particular application. Alternatively, such information may be carried through to the proposed configurations 49, to inform the system user 12 about a particular configuration parameter, so the system user 12 may then decide on a particular value. In another case, the input activity filter 22 may associate more than one input activity and corresponding UI object with each configuration parameter 42. For example, the input activity filter 22 may associate the drop-down menu 54 for the input activity of recommending a specific engine model, along with the comment box 56 for the input activity of commenting on the engine model recommendation. That way, the value of that configuration parameter is pre-selected by the external information source 48 and the system user 12 may use the comments to make an informed decision of whether to accept that pre-selected value.

The second component of the Configuration Input Manager 20 is referred to as the input activity engager 24. The input activity engager 24 allows the system user 12 to choose and publish or broadcast the activities that have been filtered by the activity filter 22 to the external information sources 48. The input activity engager 24 first facilitates the system user 12 in engaging the external information sources 48 on various channels 44. The various channels 44 provide different means of communication or expression to engage the external information sources 48. For example e-mail is one channel that can be selected to initially request the participation of selected external information sources 48 in helping the system user 12 in configuring the product 46. Those external information sources 48 who agree to participate become members of an e-commerce platform by agreeing to participate. The input activity engager 24 next identifies a suitable channel for each activity filtered by the activity filter 22, according to that input activity and the particular members (participating people) of the external information sources 48 selected to perform that input activity. Each participant of the external information sources 48 can be reached through different channels 44, such as mobile networks, World-Wide Web, e-mail, social networking sites, etc. Each activity also requires a specific form of input. For each activity, the input activity filter 22 will filter the kind of channel 44 required to reach the specific external information source 48 (person), and the kind of input that is required from that specific person for that activity. For example, the system user 12 may specify (or the system 10 may otherwise infer) particular members of the external information sources 48 to query about each configuration parameter. Thus, based on one or both of the content of the configuration parameter and any particular external information source specified, the input activity engager 24 may select a suitable channel 44. In one implementation, this second feature incorporates a pre-configured XML (Extensible Markup Language) mapper that associates channels with Activities.

The third component of the product configuration system 10 is a channel adapter module 26. The channel adapter module 26 includes a set of channel adapters and the control logic for invoking a particular adapter for a given channel selected for a configuration parameter 42 by the input activity engager 24. Each channel 44 requires a specific format in which the configuration parameter has to be exported. For instance, for a mobile device channel, a web-channel might be selected, but using a customized specification for the webpages to be displayed on the mobile device. The selected adapter may establish the connection protocol and/or application programming interface (API) level connection with the external information sources 48. Generally, an API includes a particular set of rules and specifications, embodied as computer usable program code, which software programs can follow to communicate with each other. For instance, if a specific activity is selected to post a selected configuration parameter 42 to a broadcasting medium, such as advertising channels, then a specific adaptor for the broadcasting medium may be invoked. Different channels 44 require different procedures and protocols to be invoked. For example, e-mail may be use a simple mail transfer protocol (SMTP) or Internet message access protocol (IMAP), a text message may use a short message service (SMS) protocol, and posting to an online collaboration forum may use a HyperText Markup Language (HTML) protocol. The selected channel and channel adapter is used both to broadcast the request for input activity to the external information sources 48 and to communicate the input provided by the external information sources 48 back to the system user 12. For example, e-mail may be governed by a two-way communication protocol.

The fourth component of the Configuration Input Manager 20 is the preference validator. The preference validator confirms whether the suggested values of the configuration parameters 42 provided through the various channels 44 by different individuals in the external information sources 48 is logically supported. The preference validator 28 may be rules-based, such as to establish which values of one configuration parameter will work with the values of another configuration parameter. For example, a rule may be defined establishing that a petrol engine is available in a 4-, 6-, or 8-cylinder model, whereas a diesel engine is only available in a 6- or 8-cylinder model. Thus, the preference validator 28 may automatically identify a conflict where an "engine fuel type" configuration parameter is set to "diesel" and a "cylinders" configuration parameter is set to "4-cylinder." After the preference validator 28 has analyzed the input from the external information sources 48, the Configuration Input Manager 20 outputs the input for the configuration parameters to the Configuration Builder 30. The information regarding the configuration parameters 42 provided by the external information sources 48 may include not only recommended values for specific parameters but also commentary and other descriptive forms of information that may be carried through the various system components to a later stage.

The first component of the Configuration Builder 30 is the data structure builder 32. The data structure builder 32 analyzes the input regarding the various configuration parameters 42 to generate a data structure, such as a map or tree. The data structure represents possible combinations of parameter values that are consistent with the input. Each unique combination of parameter values defines a different proposed configuration. The possible combinations of options, as limited by the input from the external information sources 48, are typically going to be fewer in number than the combinations that would be possible when taking all of the different values of all the different configuration parameters into account. In some cases, each member of the external information sources 48 will be assigned a different set of parameters for which to provide input. For example, in configuring a new family automobile, the father may be designated as the primary user 12 and in charge of choosing the engine. The mother may be a member of the external information sources 48 in charge of choosing paint and interior colors. A child may be another member of the external information sources 48, in charge of selecting certain optional accessories. Where each configuration parameter 42 is assigned to one and only one person for input, as few as just one possible configuration may emerge. However, receiving input from multiple external information sources 48 will typically result in one or more parameters having more than one possible value. Additionally, more than one person may provide input regarding the same parameter, resulting in more than one possibly acceptable value for each configuration parameter 42. The variety of different parameter values resulting from the input from the external information sources 48 can be well represented in the data structure, such as a map or tree.

The second component of the Configuration Builder 30 is the choice traversor 34. The functions of the choice traversor 34 include traversing the data structure (e.g. map or tree), and allowing individual choices from the data structure to be selected and returned to the product configurator. For each configuration parameter, there may be multiple choices of answers received from different participants within the external information sources 48. A set of different configurations are possible using the different choices obtained from the external information sources 48. The choice traversor 34 builds such a data structure that will obtain all the choices for all configuration parameters and builds the possible combination of them. The choice traversor 34 can use an algorithm to traverse different paths along the data structure. For example, a depth-first search (DFS) can be used to explore as far as possible along each branch of a data tree before backtracking.

The third component of the Configuration Builder 30 is the preview filter 36. The preview filter 36 presents the one or more proposed product configurations 49 to the system user 12 according to the input from the external information sources 48. The input provided by the external information sources 48 commonly results in more than one product configuration, such as when more than one person comments on each configuration parameter 42. Each proposed product configuration has a different set of values, such that any two proposed product configurations have different values for at least one of the configuration parameters that fully define the respective product configurations. The preview filter 36 allows the system user 12 to navigate through the various product configurations 49 for consideration. The proposed product configurations 49 may be presented in a graphical format, a text format, or a hybrid text-and-graphical format. For example, in the case of configuring an automobile, an on-screen image may be rendered visually illustrating at least some of the features, and providing text where necessary or applicable, such as in the case of features that are not easily illustrated. In some cases, there may be many possible combinations of parameter values consistent with the input from the external information sources 48, and an algorithm such as a DFS algorithm may be used to select different combinations of parameters and present the corresponding proposed product configurations 49. After obtaining different choices from external sources, the system user 12, as moderator, may prefer to visualize the product with different configurations assembled from different choices. Using the choice traversor 34, for each choice, the system 10 will be able to provide a visual representation for each of the different configurations. Based on certain metrics like different external sources giving the same choice for a specific configuration parameter, the system prioritizes the display of different configurations. Also large number of configuration parameters and obtaining input from multiple external sources might lead to large number of possible combinations obtained and the system might have to prioritize based on parameters such as multiple external sources choosing the same choice for a specific configuration parameter.

Figure 2:
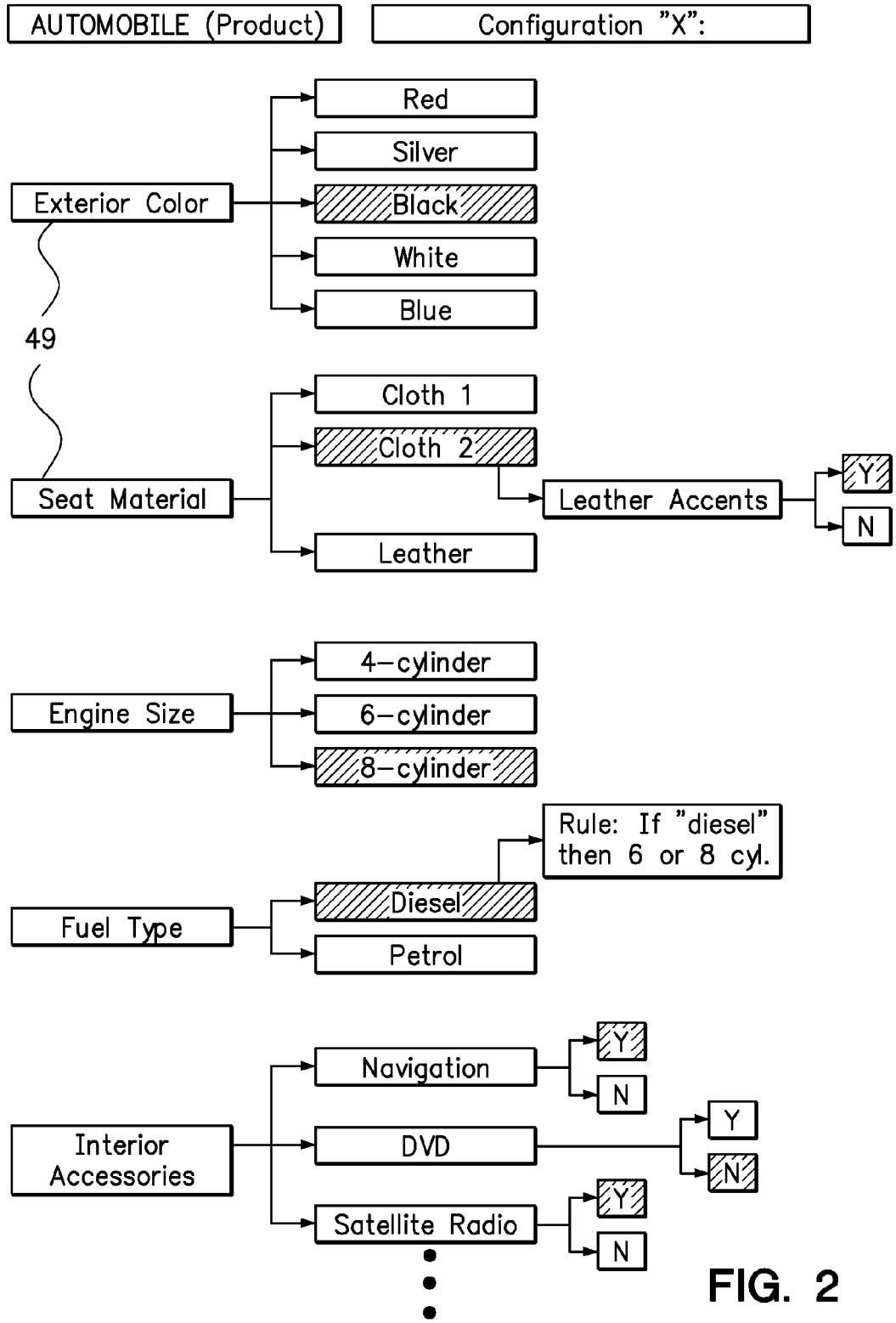
FIG. 2 is a diagram of a partial data structure highlighting values of configuration parameters for a particular product configuration.

FIG. 2 is a diagram of a partial data structure highlighting values of configuration parameters for a particular product configuration "X." The configuration parameters 49 in this example include an exterior paint color, seat material, engine size, fuel type, and interior accessories. Each configuration parameter 49 branches off into a plurality of possible values for that configuration parameter. The exterior paint color can be either red, silver, black, white, or blue. In Configuration X the paint color is black. For some parameters, the only choice is whether to include or exclude an item, which can be represented as a binary option. For example, if "Cloth 2" is selected as the seat material, then leather accents are provided as an option. A binary (Y/N) is option is provided for selecting whether to include leather accents. The leather accents are selected in Configuration X (the "Y" is highlighted). Binary selections are also used to indicate whether each of the optional interior accessories (navigation, DVD, satellite radio) are to be included in a particular configuration. In Configuration X, navigation and satellite are included, but not DVD. Other selections in Configuration X include an 8-cylinder engine size that uses Diesel as the fuel type.

Rules may be generated defining mutual exclusivity between a particular value of one configuration parameter and a particular value of another configuration parameter. For example, a rule may be defined whereby Diesel engines are only available in 6- or 8-cylinder models, but not in 4-cylinder models. If the system user or an external information source attempted to enter the conflicting selections of diesel engine and 4-cylinder engine size, an alert or flag would be generated in this example. Alternatively, the rules may be applied to resolve any conflicting choices internally to the network. If the conflicting choices cannot be resolved internally by the product configuration system, then a prompt may be generated at the originating UI for attention of the system user or at one or more remote UI for attention of the external information sources, so that the system user or external information sources may possibly resolve the issue.

Figure 3:
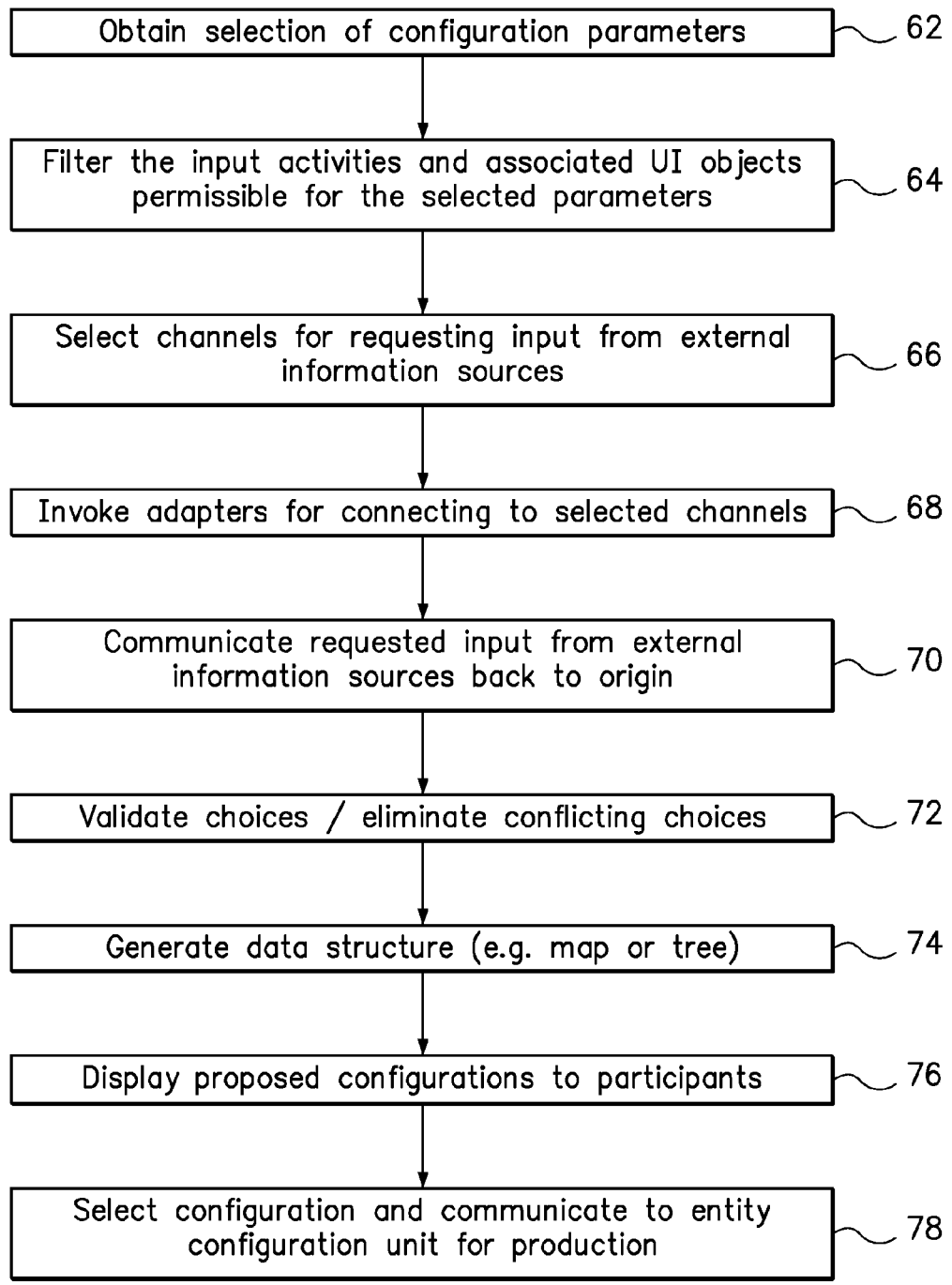
FIG. 3 is a flowchart generally outlining an embodiment of a computer-enabled product configuration method.

FIG. 3 is a flowchart 60 generally outlining an embodiment of a computer-enabled product configuration method. The method may be performed using the product configuration system 10 of FIG. 1. For example, steps 62, 64, 66, and 68 may be orchestrated by the Configuration Input Manager and steps 70, 72, 74, 76, 78 may be orchestrated by the Configuration Builder of FIG. 1. Thus, additional details or example implementations of the steps in this flowchart may be informed with reference to the discussion of FIG. 1. However, the method is not to be limited to the example implementations provided herein.

In step 62, a selection of configuration parameters is obtained for which input will be requested from external information sources. The selection may be obtained by providing a list of all possible configuration parameters to a system user at an originating UI (i.e. "origin") and having the system user select which of the configuration parameters with respect to which he or she would like to receive input. This selection may be provided using input peripherals such as a keyboard, pointing device, touch-sensitive display screen, or a combination thereof.

In step 64, the selection of configuration parameters from step 62 is filtered to select one or more input activities and corresponding UI objects for each of the selected configuration parameters. A separate input activity may be selected for each type of input the system user is requesting. For some configuration parameters, the system user may want the specific value to be supplied by an external information source, subject to the approval of the system user. For other configuration parameters, the system user may want subjective input such as comments or posts about the configuration parameter. The system user may select more than one type of input activity. In step 64, the type of UI object for each input activity may be automatically selected. Filtering may include identifying all of the various types of input that are permissible on the selected configuration parameter. For instance, for the activity of selecting a color, a color palette including the permissible colors may be exported.

In step 66, channels are selected for the various input activities and external information sources to be queried. For each configuration parameter, one or more particular channel is automatically selected according to the input activity. The channel may also depend on a particular external information source that may be requested. For example, if a particular external information source has a preference to be contacted by e-mail, then an e-mail channel and appropriate protocol may be invoked as the channel, where the particulars of the channel may depend in part on the specific person being contacted. For soliciting commentary such as in the form of a post or forum thread, the channel selected may be a web-based protocol directed to a specific website or a news reader protocol directed to a newsgroup.

In step 68, the specified channel adapter is invoked for accessing that channel. For instance, if an advertising channel is selected, then an appropriate broadcast mechanism and associated channels are invoked. For instance, for advertising channels, a broadcaster may be invoked that has knowledge of the addresses of the broadcast destinations. The selected advertising channels are used to communicate the request for input to one or more external information sources at one or more remote UI. The respective UI objects from step 64 are invoked at the remote UI.

In step 70, the input from the external information sources flows back to the originating UI. The same channels selected for communicating requests for input to the remote UIs are used to communicate the information provided by the external information sources back to the originating UI.

In step 72, any specific values for configuration parameters provided by the external information sources are validated by a process of functional verification. An alert may be generated in the case of for any conflicting parameter values for two or more configuration parameters, according to a rules-based methodology. If possible, the rules may be applied to resolve any conflicting choices internally to the network of originating UI and the one or more remote UI. If the conflicting choices cannot be resolved internally, by machine, then a prompt may be generated at the originating UI for attention of the system user or at one or more remote UI for attention of the external information sources, so that the system user or external information sources may possibly resolve the issue.

Step 74 involves generating a data structure, such as a map or a tree, of different configurations based on possible combinations of parameter values. Step 76 allows the proposed configurations to be selectively displayed to the participants. The participants include at least the system user who has authority to approve one of the proposed configurations. The participants may also include some of the external information sources, particularly those sources who are also intended end-users of the product (e.g. family members who will benefit from purchase of family car). The proposed configurations may be presented as different views of the configured product, such as graphical depictions and/or text descriptions. Another optional view could be to display a graphical representation of the entire map or tree generated in step 74, including all possible parameter values consistent with the input provided by the external information sources. One view of a proposed configuration could be to display the full map or tree, and to graphically distinguish the particular parameter values, such as using bolding or highlighting. As a participant cycles through each view, the different parameter values of each configuration would be highlighted.

In step 78, one of the proposed configurations is selected by the system user, having authority to make that selection. The selected configuration is then communicated to an entity configuration unit for production. For example, a selected automobile configuration may be communicated to the factory. The system user may also authorize purchase of the selected product configuration in step 78.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product including computer usable program code embodied on a non-transitory, computer usable storage medium, the computer program product comprising:
   computer usable program code defining a set of configuration parameters for a product and defining a set of parameter values for each configuration parameter;
   computer usable program code for selecting one or more different user interface (UI) objects for each configuration parameter, each UI object configured for receiving electronic input regarding the associated configuration parameter;
   computer usable program code for selecting a channel for each configuration parameter and transmitting the configuration parameters over a network from an originating user interface to one or more remote user interfaces on the selected channels;
   computer usable program code for initiating the UI objects selected for the transmitted configuration parameters at the one or more remote user interfaces to receive input from external information sources regarding the user selection of configuration parameters;
   computer usable program code for generating a data, structure representing different combinations of configuration parameter values that are consistent with the received input from the external information sources;
   computer usable program code defining a UI object for receiving descriptive input regarding a selected configuration parameter; and
   computer usable program code for electronically scanning the descriptive input and converting the descriptive input into a default value of the respective configuration parameter.

2. The computer program product of claim 1, further comprising:
   computer usable program code for selectively displaying each combination of configuration parameter values in the data structure as a separate proposed product configuration.

3. The computer program product of claim 2, further comprising:
   computer usable program code for automatically authorizing the production of the selected product configuration in response to receiving user input selecting one of the proposed product configurations.

4. The computer program product of claim 1, further comprising:
   computer usable program code for analyzing the data structure to identify a conflict between the value of one configuration parameter and the value of another configuration parameter specified by the external information sources.

5. The computer program product of claim 1, further comprising:
   computer usable program code defining a UI object for specifying one of the parameter values for a selected configuration parameter.

6. The computer program product of claim 5, wherein the UI object for specifying one of the parameter values for a selected configuration parameter is a multiple choice selector, a binary selector, a drop-down menu, or a color palette.

7. The computer program product of claim 1, wherein the UI object for receiving descriptive input regarding a selected configuration parameter is a comment box, a forum, or a newsgroup.

8. The computer program product of claim 1, further comprising:
   computer usable program code for receiving a user-selected subset of the configuration parameters, and transmitting only the user-selected subset of configuration parameters to the one or more remote user interfaces.

\* \* \* \* \*

UNITED STATES PATENT AND TRADEMARK OFFICE
CERTIFICATE OF CORRECTION

| | | |
|---|---|---|
| PATENT NO. | : 9,292,872 B2 | Page 1 of 1 |
| APPLICATION NO. | : 13/311896 | |
| DATED | : March 22, 2016 | |
| INVENTOR(S) | : George T. Jacob Sushil et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1141 days.

Signed and Sealed this
Fourteenth Day of June, 2016

Michelle K. Lee
*Director of the United States Patent and Trademark Office*